US011033877B2

(12) United States Patent
Vicentini et al.

(10) Patent No.: US 11,033,877 B2
(45) Date of Patent: Jun. 15, 2021

(54) IRON OXIDE ABSORBENT COMPOSITIONS

(71) Applicant: Clariant Corporation, Louisville, KY (US)

(72) Inventors: Valéria Perfeito Vicentini, Suzano São Paulo (BR); Chandra Ratnasamy, Louisville, KY (US); Jeff Braden, New Albany, IN (US); Matthew R. Purcell, Louisville, KY (US); Marc Kemper Born, Louisville, KY (US); Marco Antonio Logli, Suzano São Paulo (BR)

(73) Assignee: Clariant international, Ltd, Muttenz (CH)

(*) Notice: Subject to any disclaimer, the term of this patent is extended or adjusted under 35 U.S.C. 154(b) by 821 days.

(21) Appl. No.: 15/701,469

(22) Filed: Sep. 12, 2017

(65) Prior Publication Data
US 2018/0071713 A1 Mar. 15, 2018

Related U.S. Application Data

(60) Provisional application No. 62/394,285, filed on Sep. 14, 2016.

(51) Int. Cl.
| | | |
|---|---|---|
| *B01J 20/02* | (2006.01) | |
| *B01J 20/06* | (2006.01) | |
| *B01J 20/08* | (2006.01) | |
| *B01J 20/10* | (2006.01) | |
| *B01J 20/16* | (2006.01) | |
| *B01J 20/28* | (2006.01) | |
| *B01J 20/30* | (2006.01) | |
| *B01J 23/745* | (2006.01) | |
| *B01D 53/02* | (2006.01) | |
| *B01D 53/04* | (2006.01) | |
| *B01D 53/14* | (2006.01) | |
| *C01B 3/56* | (2006.01) | |

(52) U.S. Cl.
CPC .............. *B01J 20/06* (2013.01); *B01D 53/02* (2013.01); *B01D 53/04* (2013.01); *B01D 53/1468* (2013.01); *B01J 20/106* (2013.01); *B01J 20/16* (2013.01); *B01J 20/2803* (2013.01); *B01J 20/28042* (2013.01); *B01J 20/305* (2013.01); *B01J 20/3035* (2013.01); *B01J 20/3078* (2013.01); *C01B 3/56* (2013.01); *B01D 2252/10* (2013.01); *B01D 2253/1124* (2013.01); *B01D 2256/24* (2013.01); *B01D 2256/245* (2013.01); *B01D 2257/30* (2013.01); *B01D 2257/304* (2013.01); *B01D 2257/306* (2013.01); *B01D 2257/308* (2013.01)

(58) Field of Classification Search
CPC ........ B01J 20/0229; B01J 20/06; B01J 20/08; B01J 20/10; B01J 20/106; B01J 20/16; B01J 20/2803; B01J 20/28042; B01J 20/3035; B01J 20/305; B01J 20/3078; B01J 23/745
USPC ......................................................... 502/406
See application file for complete search history.

(56) References Cited

U.S. PATENT DOCUMENTS

| | | | | |
|---|---|---|---|---|
| 6,800,587 | B2 * | 10/2004 | Imai ...................... | B01J 23/745 502/338 |
| 7,442,362 | B2 * | 10/2008 | Conca ................... | B01J 23/745 106/456 |
| 7,879,136 | B2 * | 2/2011 | Mazyek .................. | B01J 20/20 95/27 |
| 7,892,520 | B2 * | 2/2011 | Lu .......................... | C02F 1/283 423/634 |
| 8,574,450 | B2 * | 11/2013 | Conca ..................... | B41F 1/50 252/62.56 |
| 9,149,792 | B2 | 10/2015 | Zhou | |
| 9,669,390 | B2 * | 6/2017 | Duvenhage ............ | B01J 35/023 |
| 10,086,366 | B2 * | 10/2018 | Duvenhage ............. | B01J 35/02 |
| 2004/0007498 | A1 | 1/2004 | Gislason | |
| 2008/0307960 | A1 * | 12/2008 | Hendrickson ........... | B01J 20/06 95/28 |
| 2014/0190310 | A1 | 7/2014 | Dilsky | |
| 2015/0251167 | A1 * | 9/2015 | Duvenhage ............ | B01J 35/002 502/245 |
| 2015/0336081 | A1 * | 11/2015 | Mazyek ................... | B01J 20/20 502/338 |
| 2016/0347633 | A1 * | 12/2016 | Lee ......................... | C02F 1/705 |
| 2017/0209852 | A1 * | 7/2017 | Duvenhage ............ | B01J 23/745 |
| 2017/0267608 | A1 * | 9/2017 | Wang ..................... | B01J 35/0013 |

OTHER PUBLICATIONS

G. Schimanke, "In Situ XRD study of the phase transition of nanocrystalline maghemite (gamma-Fe2O3) to hematite (apha-Fe2O3)", (2000), Solids State Ionics, 136-137, p. 1235-1240.*

* cited by examiner

Primary Examiner — Cam N. Nguyen

(57) ABSTRACT

Embodiments provided herein are compositions directed to porous iron oxides, which are suitable for removing hydrogen sulfide and other sulfur-containing organic contaminants from hydrocarbon streams, and in which the iron oxide component of the composition contains both maghemite and hematite phases, with maghemite forming the greater portion of these phases. In some embodiments, magnetite, aluminum oxide, alumina silicate, and a binder comprised of an organic substance are homogenized, followed by calcining which burns away the organic and converts magnetite to a mix of maghemite and hematite.

15 Claims, No Drawings

IRON OXIDE ABSORBENT COMPOSITIONS

PRIORITY STATEMENT

This nonprovisional patent application claims priority to and benefit from U.S. Provisional Patent Application Ser. No. 62/394,285, with a filing date of Sep. 14, 2016, which is hereby incorporated by reference for all purposes.

FIELD OF INVENTION

Compositions are provided for herein, in addition to the methods for manufacturing and using the compositions, that relate to absorption and removal of contaminants from a fluid stream, such as sulfur-containing contaminants from a fluid gas stream. In particular, what is provided here are porous iron oxide absorbent materials (sometimes referred to herein as "absorbents") in which the iron oxide component is a mix of maghemite and hematite.

BACKGROUND

Iron oxides are part of a class of compounds known as metal oxides, generally represented as $M_xO_y$, which are used as absorbents and wherein M represents a metal, such as iron (Fe). One of the uses of iron oxide absorbents involves the removal of contaminants from a fluid gas stream, through absorption. Hydrogen sulfide and other sulfur-containing contaminants, such as disulfides and mercaptans, are examples of such contaminants, and natural gas and carbon dioxide streams are examples of such fluid gas streams. Often, it is desirable to remove sulfur-containing contaminants to avoid a number of problems that can occur. Sulfur compounds corrode pipes in the systems that transport the gas fluids and the vessels which store the gases. Likewise, some sulfur compounds can react and form sulfur oxides or other compounds, which present environmental concerns. In addition, with natural gas processing, it might not be feasible or permissible to transport the gas, for example from an offshore facility to an onshore facility, until the gas is substantially free of sulfur-containing contaminants such as hydrogen sulfide.

It is advantageous for absorbents which are used to absorb contaminants from a fluid stream to have sufficient physical integrity to withstand severe operating conditions, e.g., high temperature and pressure, upsets like liquid hydrocarbon carry-over, and pressure drop associated with fluid movement over the course of many operating cycles. Water or water vapor is sometimes found in the gaseous streams that are treated by the inventive compositions, so it is helpful for the iron oxide particles to avoid agglomeration and to avoid becoming compacted. Moreover, if physical insult occurs and the iron oxide particles break apart or start to break apart, it could result in smaller particles that block the pores of the end product and prevent or limit absorption. Alternatively, the resulting smaller particles might drop into spaces naturally found between the larger iron oxide particles and disrupt the gaseous flow over and around the absorbents. Additionally, it is beneficial for such absorbents to be non-hazardous, with a reduced tendency toward pyrophoricity, and to have a useful life sufficiently long as to minimize downtime for having to change and replace them. The inventive compositions disclosed herein, and the methods for their manufacture disclosed herein, meet these and other objectives.

SUMMARY OF EMBODIMENTS

Current embodiments and alternatives provide iron oxides which are suitable as absorbents for the purification of hydrocarbon gas streams and liquid streams that contain hydrogen sulfide and other contaminants. Iron oxide is the active promoter of absorption of hydrogen sulfide contaminants in these streams as well as other contaminants, for example carbon dioxide, carbon monoxide, carbonyl sulfide, disulfides, mercaptans, and thiopenes.

Such novel compositions contain inorganic materials in the form of iron oxide ($Fe_2O_3$ as maghemite/hematite phases), an alumina silicate (e.g., perlite) and aluminum oxide. This oxidized form of the iron oxide (compared to the magnetite starting material) attracts the more electronegative sulfur atom in contaminants of interest including hydrogen sulfide. Also, data shows that the relation of the phases of iron oxide in the end product improves the performance of the absorbents, for example by enhancing physical integrity and improving retention capacity. Preferably, maghemite comprises the majority of the iron oxide content in the end products, being found in a range of about 60%-90% on x-ray diffraction, and in some embodiments about 80%-90%, with the balance of the iron oxide content in the absorbent material being hematite. The aluminum oxide content is an inorganic binder providing fundamental strength against compressive forces and helps maintain the physical integrity of the end product. Besides aluminum oxide, suitable binders include, but are not necessarily limited to, bentonite, kaolin, attapulgite, silica, alumina, and mixtures thereof. The alumina silicate serves as a reinforcing agent of the absorbents' overall structure and provides a measure of resistance to pyrophoricity for the saturated absorbent when it is unloaded.

Further aspects of the present embodiments include processes for manufacturing the inventive iron oxide compositions, including the production of iron oxide end products in pelletized form. Also, the embodiments include the manufacture of absorbents that contain macropores following calcination, which are produced when an organic binder added to the mixture burns out during calcination. Accordingly, the organic binder is sometimes referred to as a "burnout agent," with corn flour being among many suitable choices because it is consumed at the production temperatures used for calcination. Other suitable organic binders can be in the solid or liquid phase, can be used individually or in combination, and include celluloses, such as carboxymethylcellulose and hydroxymethylethylcellulose; and starches, such as corn starch and starch acetates. In use, iron oxides according to present embodiments are either supported on inert materials such as alumina or others as known in the art, or optionally provided on fixed beds in a spaced relationship, whereby contaminants are removed as the fluid passes through, past or over the absorbents.

DESCRIPTION OF MULTIPLE EMBODIMENTS AND ALTERNATIVES

In some embodiments, porous iron oxides, according to multiple embodiments and alternatives, are comprised of iron oxide (maghemite being the majority, with some hematite), aluminum oxide, and alumina silicate. In some embodiments, the absorbents are manufactured by a series of steps, comprising:

a) mixing starting materials of iron oxide ($Fe_3O_4$, as magnetite), alumina silicate, aluminum oxide, and an organic binder that aids in the production of absorbent iron oxides and serves as a burnout agent upon calcining;

b) homogenizing the mixture formed in a) in an appropriate mixer into a substantially homogenous mixture;

c) optionally adding a dilute solution of acetic acid to the mixture achieved in step b) to allow the alumina to peptize;

d) as needed, adding deionized water to the mixture until a feed is obtained of a consistency that is suitable for being pelletized in a Kahl mill or like apparatus;

e) compressing and pelletizing the feed achieved in b) in a Kahl mill or other suitable apparatus, at a frequency and for a duration sufficient to pelletize substantially all the feed material, in which the apparatus is optionally outfitted with a die configured to cut the product into predetermined sizes;

f) as desired, cutting the pellets achieved in e) to desired dimensions, e.g., 3×4 mm in 6-10 mm lengths; and g) drying and calcining the iron oxides; calcining allows the organic binder to burnout (forming macropores in the end product), and converts the iron oxide from magnetite to mixed phases of maghemite and hematite.

A number of suitable alternatives can be used in place of or with aluminum oxide as an inorganic binder, such as is well known in the art.

In some embodiments, compressing the feed occurs for a period of 5-15 minutes and optionally includes addition of deionized water to control feed thickness. In embodiments, the feed is separated into multiple individual units. Optionally, this occurs through palletization. In some embodiments, individual pellets are cut to a length of 6-10 mm.

In some embodiments, the weight percentages of the starting materials are about 60%-90% by weight iron oxide (magnetite), about 5%-20% alumina silicate as reinforcing agent, about 5%-20% aluminum oxide as inorganic binder, which can be boehmite alumina, and about 1%-5% organic binder. Additionally, about 0.3% acetic acid may be added to peptize the alumina, with proper adjustment to the other weight percentages. Following calcination, the end product is an absorbent iron oxide that comprises:

i) iron oxide as maghemite and hematite;
ii) alumina silicate; and
iii) aluminum oxide.

In some embodiments, maghemite comprises about 60%-90% of the iron oxide content and hematite comprises the balance of the iron oxide content. Alternatively, maghemite comprises about 80%-90% of the iron oxide content and hematite comprises the balance of the iron oxide content. Generally, the burnout agent is consumed and creates pores in the end product as it burns out during calcination. In some embodiments, a burnout agent is selected that will also serve as a binder that promotes the green (uncalcined) strength of the material and assists in the formation of pellets, which is a suitable form for the end product. Preferably, the organic binder burns off at temperatures at or above 150° C. It has been found that the use of a suitable organic agent, even after burnout, reduces brittleness in the end product. In some embodiments, the temperature of the calcination oven is ramped from ambient conditions to 120° C. at a rate of 5° C./min, and held at 120° C. for 120 minutes, then ramped from 120° C. to 400° C. at a rate of 5° C./min, and held for 180 minutes, then ramped from 400° C. to ambient at a rate of 5° C./min. At the conclusion, the calcined material is transferred and sealed into an appropriate container, e.g., plastic.

A range of starting materials are suitable for inclusion with the present embodiments. By way of non-limiting examples, a suitable magnetite starting material has an iron oxide content greater than 94%, a moisture content less than 2%, and a density of 4.6 g/mL. A suitable alumina silicate has a content that is primarily silicon dioxide (about 73.8%), aluminum oxide (about 13.9%) and a moisture content of less than 1.0%. A suitable aluminum oxide for the embodiments contains an alumina content of about 74%, and a moisture content of about 26%, with a bulk density of 0.22 g/mL. A suitable acetic acid for peptizing the alumina has an acetic acid content of greater than 98% and a specific gravity of 1.05 at 25° C.

Iron oxide end products within the scope of present embodiments contain about 60%-90% iron oxide (as maghemite/hematite, having been converted to $Fe_2O_3$); about 5%-20% inorganic binder (such as, for example aluminum oxide); and about 5%-20% reinforcing agent (such as, for example alumina silicate). In some embodiments, the ratio of maghemite and hematite in the iron oxide product is about 60%-90% maghemite and about 10%-40% hematite. In some embodiments, this ratio in the end product following the phase conversion of magnetite is at least about 80% maghemite and no greater than about 20% hematite, and more particularly in some embodiments this ratio is about 90% maghemite and about 10% hematite. In an embodiment, the end product comprises about 82% iron oxide (with a ratio of about 90:10 maghemite:hematite), about 12% alumina silicate, and about 6% aluminum oxide. In the embodiments disclosed herein, the greater presence of maghemite increases the sulfur absorption capacity, while larger concentrations of hematite typically would indicate the material was over-calcined.

In some embodiments, the iron oxide products according to the present composition are formed as pellets. Tablets are a suitable pelletized form, which in some embodiments are cut to dimensions of approximately 3×4 mm. Iron oxides manufactured according to present embodiments are useful as drop-in replacements for existing metal oxide absorbents, or as part of an original system.

In use, absorbents according to present embodiments produce desulfurization generally occurs through physical hindrance of contaminants, resulting from absorption into the pores and by chemical means as sulfur is attracted to the metal content of the absorbents. At such temperatures and pressures as are contemplated, the physical properties of absorbents according to present embodiments promote a long useful life, as well as excellent performance and retention capacity over that life. Although calcination burns out the organic binder and results in a decrease in physical crush strength compared to the green material, the end products provide a viable extruded product for commercial use.

In accordance with the above, the following Examples illustrate and compare certain aspects of inventive compositions to non-inventive compositions. These Examples are not meant to be limiting over the scope of embodiments as described and claimed herein.

Example 1

Starting materials for Sample A were 45% by weight iron oxide (magnetite), 5.0% aluminum oxide, and calcium and silica oxides to balance. Various productions steps stated herein (e.g., mixing, homogenizing, compressing, and calcining) were performed to produce extrudate that was about 10 mm in diameter. Test conditions consisted of a feed stream with 2500 ppm hydrogen sulfide in methane, at a gas hourly space velocity (GHSV) of 500 $h^{-1}$ run at 40° C. and 20 bar pressure. Breakthrough signifying a spent sample was determined based on 2 ppm of hydrogen sulfide leakage by gas chromatography using a chemiluminescence detector. Breakthrough was followed by pyrophoric testing of the spent sample according to two different procedures. In the first testing procedure, according to the OSHA Standards, 2 ml of spent sample stored under inert atmosphere after unloading was poured from about 1 m height onto a non-combustible surface, and it was observed whether the substance ignites during dropping or within 5 minutes of settling. This procedure was performed six times unless a positive result was obtained earlier. The second testing procedure, that simulates process condition, was conducted at the point of breakthrough, where the spent sample was inertized with nitrogen. Air flow was then introduced to determine the maximum temperature in the bed with use of five thermocouples inserted in the bed from top to bottom.

The steps were performed and the extrudate was produced in the same manner for all the Examples. The breakthrough was determined and pyrophoric testing was conducted for the saturated (i.e., spent) absorbent in the same manner for all the Examples.

Example 2

Sample B was made with the following weight percentages of starting materials: 80% iron oxide, 12% alumina silicate, 5.0% aluminum oxide, and the balance organic binder. Sample B extrudate was 3.4 mm in diameter.

Example 3

Sample C was made with the following weight percentages of starting materials: 80% iron oxide, 17% alumina silicate, and the balance organic binder. Sample C extrudate also was 3.4 mm in diameter.

Example 4

Sample D was made with the following weight percentages of starting materials: 80% iron oxide, 17% alumina, and the balance organic binder. Sample D extrudate also was 3.4 mm in diameter.

In view of the above, the following Table 1 shows the data obtained for Examples 1-4 (Samples A-D). Examples B and C support the finding that the absorbents according to some embodiments do not spontaneously ignite in air (without a source of ignition) at temperatures below about 50° C. after an exposure time of at least 5 minutes.

Thus, it was found that use of an alumina silicate as a reinforcing agent in a range between about 5%-20% reduces the pyrophoric nature of the absorbent material. The result is lower operating costs by avoiding or limiting the need to flood the reactors with water to control temperature in the reactor bed.

Embodiments described and claimed herein are not strictly limited in their application to the details of the teachings and descriptions set forth. The descriptions herein are not intended to be exhaustive of each and every conceivable variant of the teachings that could be implemented, nor are they meant to limit the understanding of the embodiments to the precise forms disclosed. Rather, it will be understood by those having ordinary skill in the art that modifications and variations of these embodiments are reasonably possible in light of the above teachings and descriptions. Also, it is to be understood that certain words and phrases used herein are for the purpose of description and should not be regarded as limiting. The use herein of words such as "including," "comprising," "e.g.," "containing," "such as" or "having" and variations of those words is meant to encompass the items listed thereafter, and equivalents of those, as well as additional items.

What is claimed is:

1. A porous absorbent for removing contaminants from a fluid stream, comprising iron oxide existing as a mixture of maghemite and hematite; at least one inorganic binder; and at least one reinforcing agent, wherein the iron oxide comprises at least about 60% by weight of the absorbent, and wherein the iron oxide is about 60%-90% maghemite and hematite substantially comprises the balance of the iron oxide content.

2. The absorbent of claim 1, wherein maghemite comprises about 80%-90% of the iron oxide content, and hematite substantially comprises the balance of the iron oxide content.

3. The absorbent of claim 1, wherein the at least one inorganic binder is aluminum oxide.

4. The absorbent of claim 1, wherein the at least one inorganic binder comprises about 5%-20% by weight of the absorbent.

TABLE 1

| Sample | Iron Oxide (% wt) | Alumina (% wt) | Alumina silicate (% wt) | Calcium Aluminum oxides (% wt) | Organic Binder (% wt) | Pyrophoric testing Effect upon exposure to air | Bed temperature after exposure to air |
|---|---|---|---|---|---|---|---|
| A | 45 | 5 | — | balance | — | Ignition within 5 minutes | 106° C. |
| B | 80 | 5 | 12 | — | 3 | No ignition within 5 minutes | 47° C. |
| C | 80 | — | 17 | — | 3 | No ignition within 5 minutes | 43° C. |
| D | 80 | 17 | — | — | 3 | Ignition within 5 minutes | 60° C. |

5. The absorbent of claim 1, wherein the reinforcing agent is an alumina silicate.

6. The absorbent of claim 5, wherein the alumina silicate is perlite.

7. The absorbent of claim 6, wherein the absorbent does not spontaneously ignite upon exposure to air at temperatures below about 50° C. after an exposure time of at least 5 minutes.

8. The absorbent of claim 1, wherein the reinforcing agent comprises about 5%-20% by weight of the absorbent.

9. A method of preparing an absorbent for removing contaminants from a fluid stream, comprising:
    mixing, to form a feed, an amount of iron oxide primarily in the form of magnetite with at least one inorganic binder; at least one organic binder; and at least one reinforcing agent;
    compressing the feed;
    separating the feed into units; and
    calcining the units to cause the organic binder to burnout of the absorbent and to induce the iron oxide in the form of magnetite to undergo phase change to a combination of maghemite and hematite,
    wherein the amount of iron oxide comprises at least about 60% by weight of the mixture, and
    wherein after calcining the iron oxide is about 60%-90% maghemite and hematite substantially comprises the balance of the iron oxide content.

10. The method of claim 9, wherein the feed is a homogenous mixture, and the amount of iron oxide in the feed is about 60% by weight.

11. The method of claim 10, wherein the remainder of the feed comprises about 5%-20% by weight inorganic binder, about 5%-20% by weight reinforcing agent, and about 1%-5% by weight organic binder.

12. The method of claim 9, wherein burnout of the organic binder results in the formation of macropores in the absorbent.

13. The method of claim 9, wherein the at least one inorganic binder is aluminum oxide.

14. The method of claim 13, wherein the reinforcing agent is perlite, and the absorbent does not spontaneously ignite upon exposure to air at temperatures below about 50° C. after an exposure time of at least 5 minutes.

15. The method of claim 9, wherein the reinforcing agent is alumina silicate.

* * * * *